(12) United States Patent
Ueta et al.

(10) Patent No.: US 11,845,452 B2
(45) Date of Patent: Dec. 19, 2023

(54) ELECTRONIC CONTROL DEVICE AND PARALLEL PROCESSING METHOD

(71) Applicant: Hitachi Astemo, Ltd., Hitachinaka (JP)

(72) Inventors: Taisuke Ueta, Tokyo (JP); Tatsuya Horiguchi, Tokyo (JP); Kenichi Shimbo, Tokyo (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 501 days.

(21) Appl. No.: 17/282,687

(22) PCT Filed: Oct. 1, 2019

(86) PCT No.: PCT/JP2019/038753
§ 371 (c)(1),
(2) Date: Apr. 2, 2021

(87) PCT Pub. No.: WO2020/071366
PCT Pub. Date: Apr. 9, 2020

(65) Prior Publication Data
US 2021/0347375 A1    Nov. 11, 2021

(30) Foreign Application Priority Data

Oct. 5, 2018  (JP) ................................ 2018-190180

(51) Int. Cl.
*B60W 50/02* (2012.01)
*B60W 50/023* (2012.01)
*G06F 9/50* (2006.01)

(52) U.S. Cl.
CPC ...... *B60W 50/0205* (2013.01); *B60W 50/023* (2013.01); *G06F 9/50* (2013.01)

(58) Field of Classification Search
None
See application file for complete search history.

(56) References Cited

U.S. PATENT DOCUMENTS 8,442,699 B2 * 5/2013 Takamatsu ............ B60W 40/10
701/58
2007/0169007 A1 * 7/2007 Hashimoto ........... B60W 50/04
717/136

(Continued)

FOREIGN PATENT DOCUMENTS

JP       7-334469 A    12/1995
JP    2014-225142 A    12/2014

(Continued)

OTHER PUBLICATIONS

International Search Report (PCT/ISA/210) issued in PCT Application No. PCT/JP2019/038753 dated Dec. 24, 2019 with English translation (five (5) pages).

(Continued)

*Primary Examiner* — Eric Coleman
(74) *Attorney, Agent, or Firm* — Crowell & Moring LLP

(57) ABSTRACT

An electronic control device includes a first processing control unit and a second processing control unit, wherein: the first processing control unit and the second processing control unit alternately start arithmetic processing with information of an external environment as an input; and second arithmetic processing of the second processing control unit is started after first arithmetic processing by the first processing control unit is started and before the first arithmetic processing is ended.

11 Claims, 9 Drawing Sheets

(56) References Cited

U.S. PATENT DOCUMENTS

| | | | |
|---|---|---|---|
| 2010/0308862 A1* | 12/2010 | Kelem | H03K 19/17764 |
| | | | 326/40 |
| 2011/0106363 A1* | 5/2011 | Muller | B61L 23/18 |
| | | | 701/28 |
| 2016/0036077 A1* | 2/2016 | Kim | H01M 8/04492 |
| | | | 429/432 |
| 2016/0131358 A1* | 5/2016 | Spiro | H01F 41/041 |
| | | | 455/561 |
| 2017/0082984 A1 | 3/2017 | Horiguchi et al. | |
| 2017/0135621 A1* | 5/2017 | Lee | A61B 5/18 |
| 2018/0337623 A1* | 11/2018 | Ota | H02P 27/085 |
| 2018/0348763 A1* | 12/2018 | Jiang | G05D 1/0088 |
| 2019/0146514 A1* | 5/2019 | Son | G07C 5/02 |
| | | | 701/27 |
| 2020/0034354 A1 | 1/2020 | Horita et al. | |
| 2020/0114905 A1 | 4/2020 | Ueta et al. | |

FOREIGN PATENT DOCUMENTS

| | | |
|---|---|---|
| JP | 2015-219793 A | 12/2015 |
| JP | 2016-218503 A | 12/2016 |
| JP | 2018-60281 A | 4/2018 |
| JP | 2018-101221 A | 6/2018 |

OTHER PUBLICATIONS

Japanese-language Written Opinion (PCT/ISA/237) issued in PCT Application No. PCT/JP2019/038753 dated Dec. 24, 2019 (five (5) pages).

* cited by examiner

FIG. 9

| COMPARATIVE TARGET | | | SITE DETERMINED TO BE ABNORMAL BY FAILURE DETERMINATION UNIT 242 |
|---|---|---|---|
| t4 PREDICTION AND t12 PERIPHERAL COGNITION | t9 PREDICTION AND t12 PERIPHERAL COGNITION | t4 PREDICTION AND t9 PREDICTION | |
| NORMAL | NORMAL | - | NORMAL |
| NORMAL | ABNORMAL | - | t9 PREDICTION RESULT |
| ABNORMAL | NORMAL | - | t4 PREDICTION RESULT |
| ABNORMAL | ABNORMAL | NORMAL | t12 COGNITION RESULT |
| ABNORMAL | ABNORMAL | ABNORMAL | UNIDENTIFIABLE |

ELECTRONIC CONTROL DEVICE AND PARALLEL PROCESSING METHOD

TECHNICAL FIELD

The present invention relates to an electronic control device and a parallel processing method.

BACKGROUND ART

Technological development aimed at the automated driving of vehicles is in progress. With automated driving, it is necessary to recognize the surroundings and control the vehicle on behalf of the driver, and an enormous amount of information processing is required. In order to deal with the increasing amount of information processing, in addition to the use of CPUs (Central Processing Units), the use of PLDs (Programmable Logic Devices), such as an FPGA (Field Programmable Gate Array) capable of reconfiguring logic circuits, and GPUs (Graphics Processing Units), is being considered. When performing high-speed arithmetic operations using hardware chips such as PLDs and GPUs, proper processing giving consideration to power consumption is required. PTL 1 discloses a parallelization compilation method of generating, from a sequential program described so that it can be processed with a single-core processor, a parallel program parallelized so that it can be processed with a multi-core processor, comprising: a classification step of classifying a processing group configuring the sequential program into sequential processing which is sequentially operated on a single core configuring the multi-core processor and parallel processing which is operated in parallel on a plurality of cores configuring the multi-core processor; an allocation step of executing uneven allocation processing which unevenly allocates processing classified as the parallel processing in the classification step to the plurality of cores; and a generation step of generating the parallel program based on a classification result of the classification step and an allocation result of the allocation step.

CITATION LIST

Patent Literature

[PTL 1] Japanese Unexamined Patent Application Publication No. 2016-218503

SUMMARY OF THE INVENTION

Problems to be Solved by the Invention

With the invention described in PTL 1, the allocation of processing to the respective cores becomes complicated as the parallel number increases pursuant to the increase in the number of programs, and there is concern that the overhead will also increase.

Means to Solve the Problems

According to the 1st aspect of the present invention, an electronic control device includes a first processing control unit and a second processing control unit, wherein: the first processing control unit and the second processing control unit alternately start arithmetic processing with information of an external environment as an input; and second arithmetic processing of the second processing control unit is started after first arithmetic processing by the first processing control unit is started and before the first arithmetic processing is ended.

According to the 2nd aspect of the present invention, a parallel processing method executed by an electronic control device includes a first processing control unit and a second processing control unit, the parallel processing method includes the steps of: causing the first processing control unit and the second processing control unit to alternately start arithmetic processing with information of an external environment as an input; and causing second arithmetic processing of the second processing control unit to be started after first arithmetic processing by the first processing control unit is started and before the first arithmetic processing is ended.

Advantageous Effects of the Invention

According to the present invention, processing can be flexibly accelerated while suppressing the increase of overhead.

BRIEF DESCRIPTION OF DRAWINGS

FIGS. 5A and 5B comprise a diagram showing the relation of the peripheral cognition processing and the prediction processing, wherein FIG. 5A is a diagram showing an example of the own vehicle peripheral map 81 at time T, and FIG. 5B is a diagram showing an example of the own vehicle periphery prediction map 82 at time T+1 which undergoes arithmetic operation at time T.

FIG. 9 is a diagram showing an example of the failure determination method of the failure determination unit 242.

DESCRIPTION OF EMBODIMENTS

Embodiments

An embodiment of an autonomous travel control device, which is an electronic control device, is now explained with reference to FIG. 1 to FIG. 9.

<System Configuration>

Figure 1:
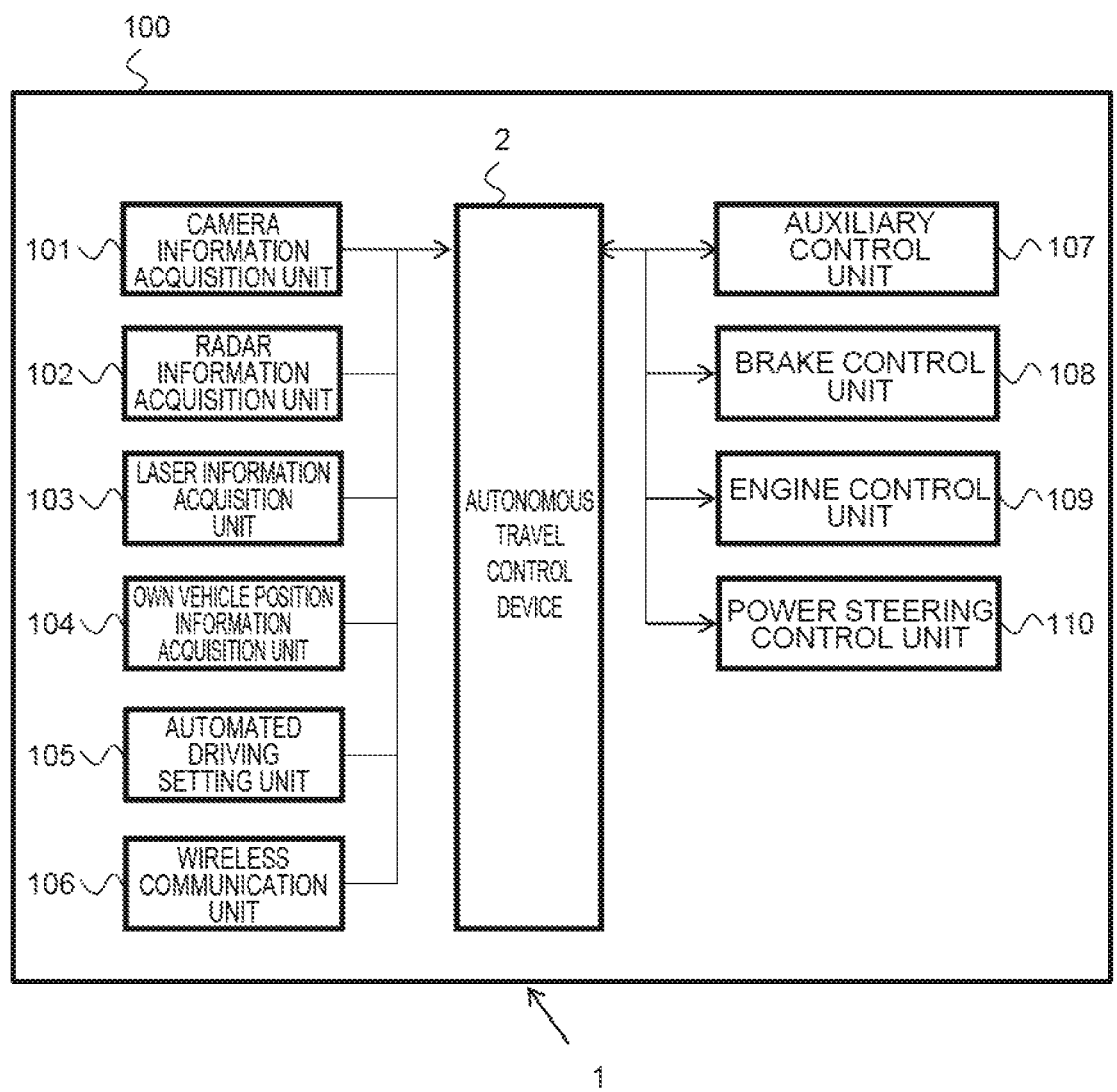
FIG. 1 is a system configuration diagram of the in-vehicle system 1.

FIG. 1 is a system configuration diagram of an in-vehicle system 1 including an autonomous travel control device 2 which is an electronic control device according to the present invention. The in-vehicle system 1 is mounted on a vehicle 100, and comprises a camera information acquisition unit 101 which acquires external circumstances of the vehicle 100 from a camera, a radar information acquisition unit 102 which acquires external circumstances of the vehicle 100 based on a radar, a laser information acquisition unit 103 which acquires external circumstances of the vehicle 100 based on a laser, and an own vehicle position information acquisition unit 104 which detects a position of the vehicle 100 using an output of a receiver of a satellite navigation system such as a GPS (Global Positioning System).

In other words, while not shown in FIG. 1, the vehicle 100 is equipped with a camera, a radar, a laser, and a receiver of a satellite navigation system. The camera information acquisition unit 101, the radar information acquisition unit 102, the laser information acquisition unit 103, and the own vehicle position information acquisition unit 104 respectively receive the respective outputs of the camera, the radar, the laser, and the receiver of the satellite navigation system. The in-vehicle system 1 additionally comprises an automated driving setting unit 105 for setting the automated driving of the vehicle 100, and a wireless communication unit 106 for updating the information of the in-vehicle system 1 OTA (Over-The-Air).

The in-vehicle system 1 additionally comprises an autonomous travel control device 2, an auxiliary control unit 107, a brake control unit 108, an engine control unit 109, and a power steering control unit 110. The autonomous travel control device 2, the auxiliary control unit 107, the brake control unit 108, the engine control unit 109, and the power steering control unit 110 are, for example, ECUs (Electronic Control Units).

The camera information acquisition unit 101, the radar information acquisition unit 102, the laser information acquisition unit 103, the own vehicle position information acquisition unit 104, the automated driving setting unit 105, the wireless communication unit 106, the autonomous travel control device 2, the auxiliary control unit 107, the brake control unit 108, the engine control unit 109, and the power steering control unit 110 are mutually connected communicably via an in-vehicle network such as a CAN (Controller Area Network) (registered trademark) or Ethernet (registered trademark).

The camera information acquisition unit 101, the radar information acquisition unit 102, the laser information acquisition unit 103, and the own vehicle position information acquisition unit 104 respectively send, to the autonomous travel control device 2, information that they each received from a sensor or the like. Moreover, the camera information acquisition unit 101, the radar information acquisition unit 102, the laser information acquisition unit 103, and the own vehicle position information acquisition unit 104 may also send, to the autonomous travel control device 2, information to the effect that an abnormality in their respective sensors has been detected.

The automated driving setting unit 105 sends, to the autonomous travel control device 2, setting information such as the destination, route, and running speed of the automated driving. However, a part of the information sent by the automated driving setting unit 105 may also be information received from the outside via the wireless communication unit 106.

The autonomous travel control device 2 performs processing for automated driving control and, based on the processing result, outputs control orders to the brake control unit 108, the engine control unit 109, and the power steering control unit 110. The auxiliary control unit 107 performs the same control as the autonomous travel control device 2 as auxiliary control. The brake control unit 108 controls the braking force of the vehicle 100. The engine control unit 109 controls the driving force of the vehicle 100. The power steering control unit 110 controls the steering of the vehicle 100.

Upon receiving a setting request of automated driving from the automated driving setting unit 105, the autonomous travel control device 2 calculates a path to be travelled by the vehicle 100 based on information of the external environment from the camera information acquisition unit 101, the radar information acquisition unit 102, the laser information acquisition unit 103, and the own vehicle position information acquisition unit 104. Furthermore, the autonomous travel control device 2 outputs the control orders of the braking force, the driving force, and the steering to the brake control unit 108, the engine control unit 109, and the power steering control unit 110 so as to cause the vehicle 100 to travel along the calculated path. The brake control unit 108, the engine control unit 109, and the power steering control unit 110, upon receiving the control orders from the autonomous travel control device 2, respectively output an operation signal to an actuator (not shown) to be controlled.

<Hardware Configuration of Autonomous Travel Control Device 2>

Figure 2:
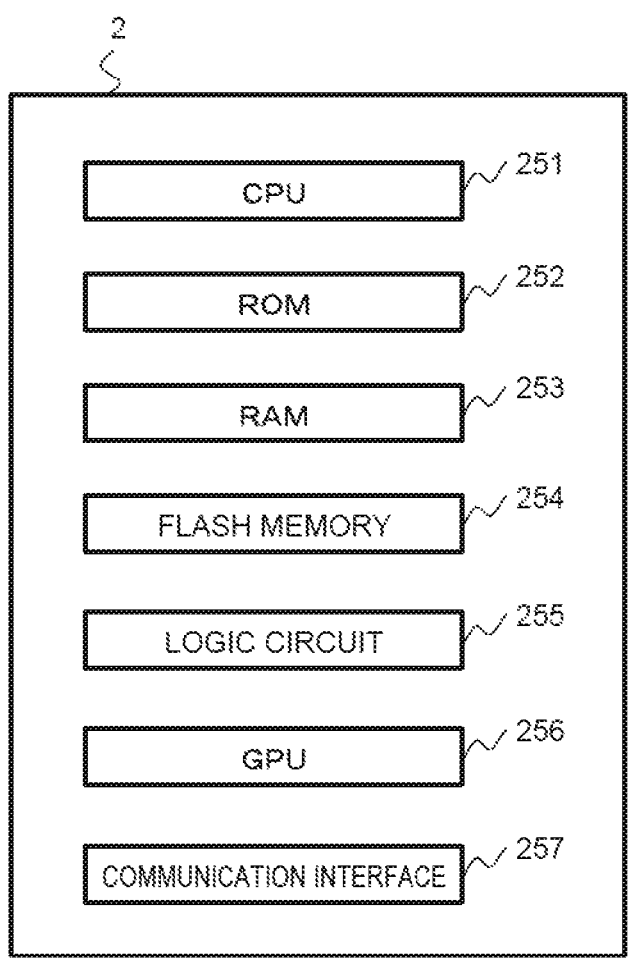
FIG. 2 is a hardware configuration diagram of the autonomous travel control device 2.

FIG. 2 is a hardware configuration diagram of the autonomous travel control device 2. The autonomous travel control device 2 comprises a CPU 251, a ROM 252, a RAM 253, a flash memory 254, a logic circuit 255, a GPU 256, and a communication interface 257. The CPU 251 and the GPU 256 realize the functions described later by reading the programs stored in the ROM 252 into the RAM 253 and then executing those programs. The flash memory 254 is a non-volatile storage area. The logic circuit 255 is a reconfigurable logic circuit using a PLD such as an FPGA. The logic circuit 255 is a so-called partially reconfigurable logic circuit in which only a part thereof can be reconfigured. The communication interface 257 is an interface which communicates based on a predetermined protocol such as a CAN.

Note that the hardware of the CPU 251, the ROM 252, the RAM 253, the flash memory 254, the logic circuit 255, and the GPU 256 configuring the autonomous travel control device 2 may each be configured on an ECU as one or more devices, or a plurality of pieces of hardware may be configured on an ECU as one device, such as with an SoC (System on Chip). Moreover, the autonomous travel control device 2 may be configured with one ECU, or configured with a plurality of ECUs.

<General Functional Configuration of Autonomous Travel Control Device 2>

Figure 3:
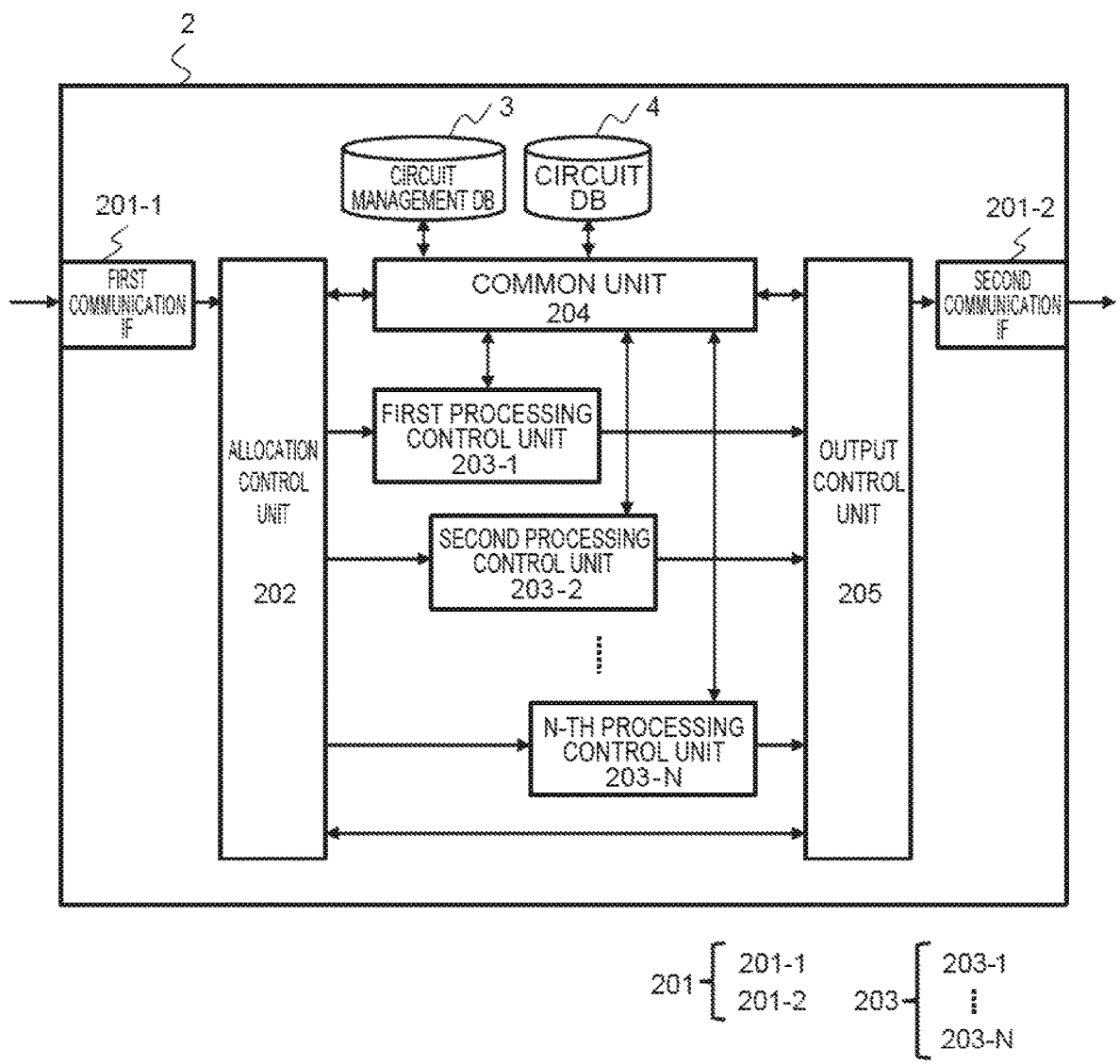
FIG. 3 is a general functional configuration diagram of the autonomous travel control device 2.

FIG. 3 is a general functional configuration diagram of the autonomous travel control device 2. The autonomous travel control device 2 includes a first communication interface 201-1, a second communication interface 201-2, an allocation control unit 202, a first processing control unit 203-1 to an N-th processing control unit 203-N(N is an arbitrary natural number of 2 or higher), a common unit 204, an output control unit 205, a circuit management database (this is hereinafter referred to as the "circuit management DB) 3, and a circuit database (this is hereinafter referred to as the "circuit DB") 4. In the following explanation, the first communication interface 201-1 and the second communication interface 201-2 are collectively referred to as the "communication interface(s) 201". Moreover, the first processing control unit 203-1 to the N-th processing control unit 203-N are collectively referred to as the "processing control unit(s) 203".

The communication interface 201 is realized with the communication interface 257 of FIG. 2. The circuit management DB 3 and the circuit DB 4 are realized with the RAM 253 or the flash memory 254. The allocation control unit 202, the processing control unit 203, the common unit 204, and the output control unit 205 are configured from one among the CPU 251, the logic circuit 255, and the GPU 256, or may be configured integrally with other function parts.

The autonomous travel control device 2 is connected to the camera information acquisition unit 101, the radar information acquisition unit 102, the laser information acquisition unit 103, the own vehicle position information acquisition unit 104, the automated driving setting unit 105, and the wireless communication unit 106 of FIG. 1 via the first communication interface 201-1, and connected to the auxiliary control unit 107, the brake control unit 108, the engine control unit 109, and the power steering control unit 110 via the second communication interface 201-2. Note that, in FIG. 3, while the autonomous travel control device 2 comprises two logical communication interfaces; namely, the first communication interface 201-1 and the second communication interface 201-2, the autonomous travel control device 2 may also comprise only one logical communication interface equipped with the functions of the two.

The allocation control unit 202 collects information input from the communication interface 201, and automated driving setting information input from the automated driving setting unit 105. The information input from the communication interface 201 is sensor information output from the camera information acquisition unit 101, the radar information acquisition unit 102, the laser information acquisition unit 103, and the own vehicle position information acquisition unit 104. The allocation control unit 202 outputs the collected sensor information to one of the processing control units among the first processing control unit 203-1 to the N-th processing control unit 203-N. In other words, the allocation control unit 202 allocates the collected sensor information to one of the processing control units.

The allocation control unit 202 allocates the sensor information to the processing control units 203 in the predetermined processing cycle described later. The allocation control unit 202 notifies the output control unit 205 of the sequence information of the processing control units 203 to which the sensor information was allocated, and the processing completion timing from the processing control units 203. Note that the allocation control unit 202 may also send the collected sensor information and the automated driving setting information to the common unit 204.

Upon acquiring the sensor information from the allocation control unit 202, the processing control unit 203 executes predetermined processing, and sends the processing execution result to the output control unit 205. The first processing control unit 203-1 to the N-th processing control unit 203-N are configured by using hardware resources so that they respectively execute the same predetermined processing and the processing time will be the same. Moreover, when the processing control unit 203 uses the logic circuit 255 as hardware, the processing control unit 203 refers to the circuit management DB 3 via the common unit 204, and determines the circuit data to be used in the processing to be executed by the corresponding processing control unit 203. The determined circuit data is stored in the circuit DB 4. The circuit data is written in the corresponding processing control unit 203 and configures the logic circuit.

The common unit 204 may use the sensor information and the automated driving setting information acquired from the allocation control unit 202 to update the circuit management DB 3 and the circuit DB 4, or change the predetermined processing to be performed by the processing control unit 203. Furthermore, the common unit 204 may control the transfer sequence of the allocation control unit 202 and the output of the output control unit 205 based on the state of the processing control unit 203.

The output control unit 205 controls the processing execution results respectively acquired from the processing control units 203 as a sequential execution result. Furthermore, the output control unit 205 outputs, based on the controlled execution result, the control order of the braking force and the driving force to the second communication interface 201-2.

<Functional Configuration of Autonomous Travel Control Device 2>

Figure 4:
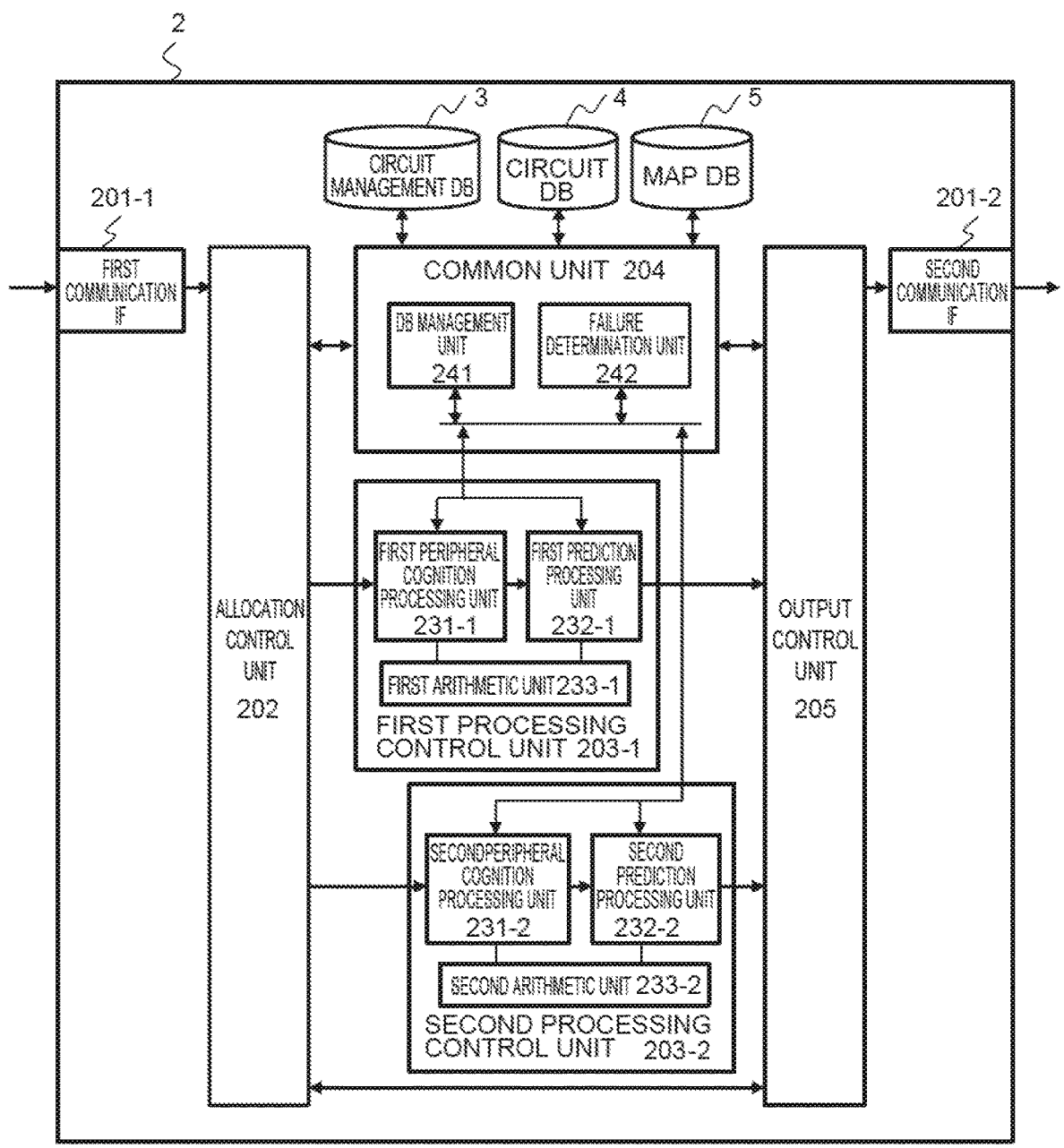
FIG. 4 is a specific functional configuration diagram of the autonomous travel control device 2.

FIG. 4 is a specific functional configuration diagram of the autonomous travel control device 2 in this embodiment. The autonomous travel control device 2 is equipped with two processing control units 203, and each processing control unit 203 includes a peripheral cognition processing unit 231, a prediction processing unit 232, and an arithmetic unit 233. The arithmetic unit 233 is configured from a logic circuit. The autonomous travel control device 2 comprises a map database (this is hereinafter referred to as the "map DB") 5 storing peripheral map information.

The first processing control unit 203-1 comprises a first peripheral cognition processing unit 231-1, a first prediction processing unit 232-1, and a first arithmetic unit 233-1. The second processing control unit 203-2 comprises a second peripheral cognition processing unit 231-2, a second prediction processing unit 232-2, and a second arithmetic unit 233-2. The first peripheral cognition processing unit 231-1 and the second peripheral cognition processing unit 231-2 are hereinafter collectively referred to as the "peripheral cognition processing unit 231". Moreover, the first prediction processing unit 232-1 and the second prediction processing unit 232-2 are hereinafter collectively referred to as the "prediction processing unit 232". Moreover, the first arithmetic unit 233-1 and the second arithmetic unit 233-2 are hereinafter collectively referred to as the "arithmetic unit 233". The common unit 204 comprises a database management unit (this is hereinafter referred to as the "DB management unit") 241 and a failure determination unit 242.

The peripheral cognition processing unit 231 uses the sensor information received from the allocation control unit 202 and the map information acquired from the map DB 5 via the DB management unit 241 to cognize objects existing in the periphery of the vehicle 100 (these are hereinafter referred to as the "own vehicle peripheral objects"). Here, the processing control unit 203 refers to the circuit management DB 3 via the DB management unit 241, rewrites the arithmetic unit 233 and causes it to execute arithmetic operations, and thereby accelerates the processing. In other words, the processing control unit 203 rewrites the logic circuit of the arithmetic unit 233 in the same processing control unit 203 with the circuit data acquired from the circuit DB 4, and causes the corresponding arithmetic unit 233 to execute arithmetic operations to cognize the own vehicle peripheral objects.

The prediction processing unit 232 uses the own vehicle peripheral object cognition result of the peripheral cognition processing unit 231 and performs the action prediction of each peripheral object. Action prediction is, for example, using the current position and speed of each peripheral object and extrapolating and obtaining a predicted position, which is a future position, of the peripheral object. Moreover, based on the predicted position of each peripheral object, the prediction processing unit 232 generates a predicted path of the own vehicle so as to avoid these positions, and sends the generated predicted path to the output control unit 205. The output control unit 205 generates control order values so that the predicted path of the own vehicle and the actual path of the vehicle 100 will coincide.

Here, the processing control unit 203 may use the arithmetic unit 233 to accelerate the arithmetic operations. More specifically, the processing control unit 203 foremost refers to the circuit management DB 3 and rewrites the logic circuit of the arithmetic unit 233 with the circuit data acquired from the circuit DB 4. Subsequently, the processing control unit 203 causes that arithmetic unit 233 to execute arithmetic operations for the action prediction of the respective peripheral objects and the generation of the predicted path of the own vehicle.

The DB management unit 241 controls the reading of information of the circuit management DB 3, the circuit DB 4, and the map DB 5 according to requests from the processing control units 203. The DB management unit 241 may additionally control the update of the circuit management DB 3, the circuit DB 4, and the map DB 5 according to the sensor information and the automated driving setting information acquired from the allocation control unit 202.

The failure determination unit 242 detects the existence of an abnormality in the peripheral cognition processing unit 231, the prediction processing unit 232, the first processing control unit 203-1 and the second processing control unit 203-2 by comparing the own vehicle peripheral object cognition result and the predicted path of the own vehicle in each processing control unit 203. Details will be described later. The failure determination unit 242 may control the transfer sequence of the allocation control unit 202 and the output of the output control unit 205 based on these abnormality detection results.

<Own Vehicle Periphery Prediction>

Figure 5A:
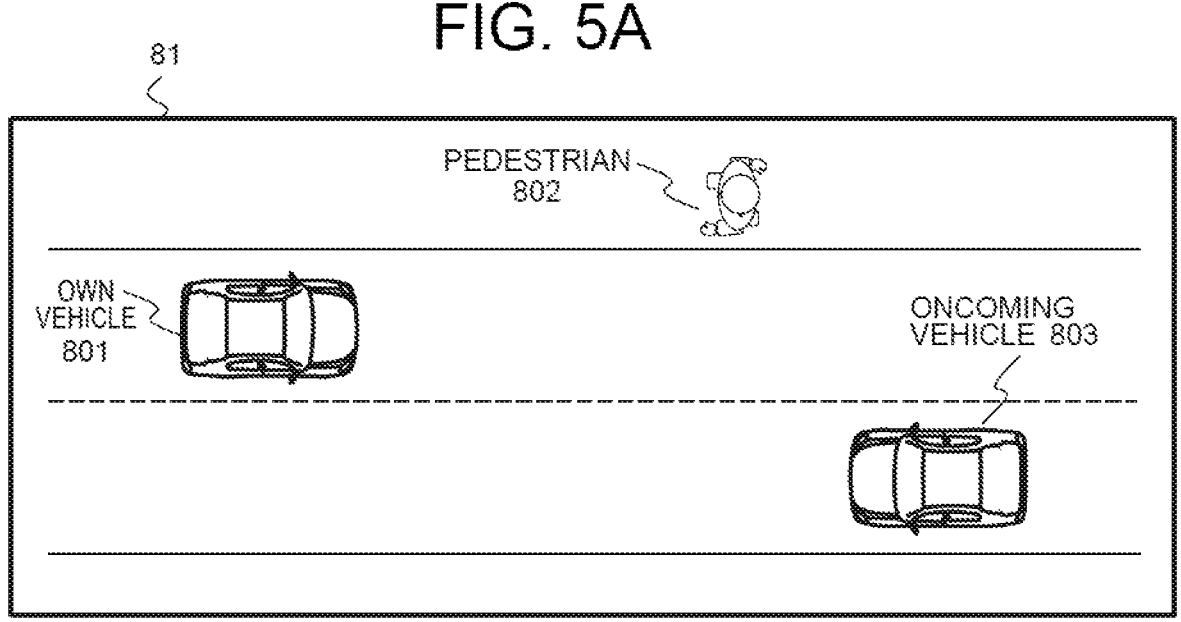
Figure 5B:
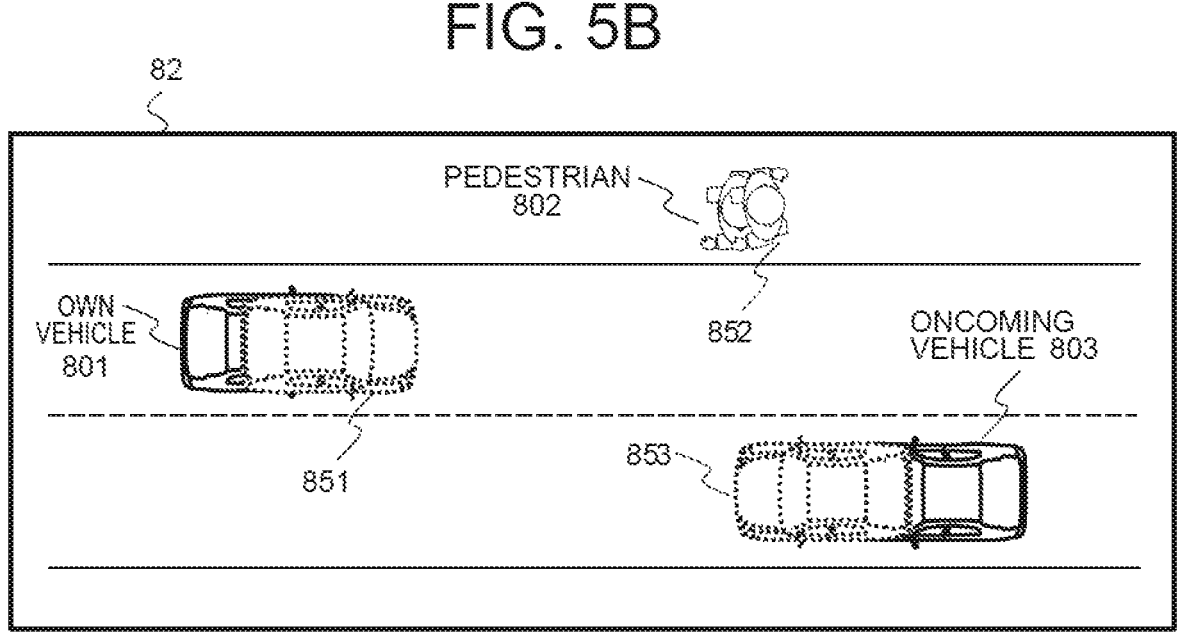

FIG. 5 is a diagram showing the relation of the peripheral cognition processing and the prediction processing. FIG. 5(a) is a diagram showing an example of the own vehicle peripheral map 81 at time T. FIG. 5(b) is a diagram showing an example of the own vehicle periphery prediction map 82 at time T+1 which undergoes arithmetic operation at time T.

FIG. 5(a) is a diagram showing an example of the cognition result of the own vehicle peripheral objects at time T executed by the peripheral cognition processing unit 231. The peripheral cognition processing unit 231 integrates the position, size, moving speed and other information of the own vehicle peripheral objects based on the sensor information received from the allocation control unit 202, maps the own vehicle peripheral objects on the map information acquired from the map DB 5, and creates an own vehicle peripheral map 81 at a certain time, in this example at time T. In FIG. 5(a), a pedestrian position 802 and another vehicle position 803 are mapped to the own vehicle peripheral map 81 in addition to the own vehicle position 801.

FIG. 5(b) is a diagram showing an example of the action prediction result of each peripheral object and the predicted path result of the own vehicle at time T+1 executed by the prediction processing unit 232. The prediction processing unit 232 predicts the position of the own vehicle peripheral objects at time T+1 onward based on the results of the peripheral cognition processing unit 231 at time T shown in FIG. 5(a). In FIG. 5(b), let it be assumed that the pedestrian predicted position 852 and the other vehicle predicted position 853 have been mapped as the action prediction result and the own vehicle predicted position 851 has been mapped as the predicted path result of the own vehicle to the own vehicle periphery prediction map 82.

Note that, while the predicted positions at time T+1 are indicated with a dotted line and the cognition results at time T shown in FIG. 5(a) are indicated with a solid line for the sake of explanation, these real positions are not necessarily included in the actual results of the prediction processing unit 232. Moreover, while only one predicted position of each object is indicated in FIG. 5(b), this kind of predicted position of each object is generated in a quantity required for generating the predicted path of the own vehicle. For example, when predicting a path for 10 seconds every 100 milliseconds, the prediction processing unit 232 will generate 100 predicted positions of each object; that is, generate 10 seconds' worth of the path every 100 milliseconds.

<Management Information of Circuit Management Database>

Figure 6:
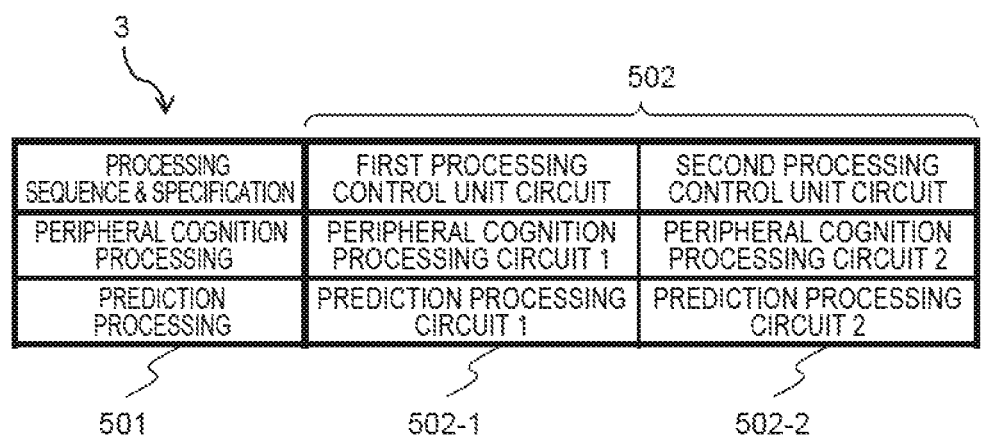
FIG. 6 is a diagram showing an example of the circuit management DB 3.

FIG. 6 is a diagram showing an example of the circuit management DB 3. The circuit management DB 3 is a database storing information of the processing sequence and the processing specification of the processing executed by the processing control unit 203, and information of the circuit data of the logic circuit configuring the corresponding arithmetic unit 233 of each processing control unit 203. The circuit management DB 3 is referenced by the processing control unit 203 via the common unit 204. FIG. 6 shows an example of the circuit management DB 3 when the autonomous travel control device 2 is configured as shown in FIG. 4.

The circuit management DB 3 includes a field of a circuit data 502 for each processing control unit 203 for each processing sequence & processing specification 501. The processing sequence & processing specification 501 indicates the processing sequence in the order of registration of the entry, and stores the processing specification to be executed by the processing control unit 203 in each order. The circuit data 502 for each processing control unit 203 stores information of the circuit data of the logic circuit configuring the corresponding arithmetic unit 233 according to the processing sequence & processing specification 501.

The example of FIG. 6 shows that "peripheral cognition processing" and "prediction processing" are stored, in that order, in the field of the processing sequence & processing specification 501, and that each processing control unit 203 first executes the peripheral cognition processing, and secondly executes the prediction processing.

A symbol 502-1 shows information of the circuit data for the first processing control unit 203-1 and a symbol 502-2 shows information of the circuit data for the second processing control unit 203-2 according to their respective processing specifications.

<Operating Sequence>

Figure 7:
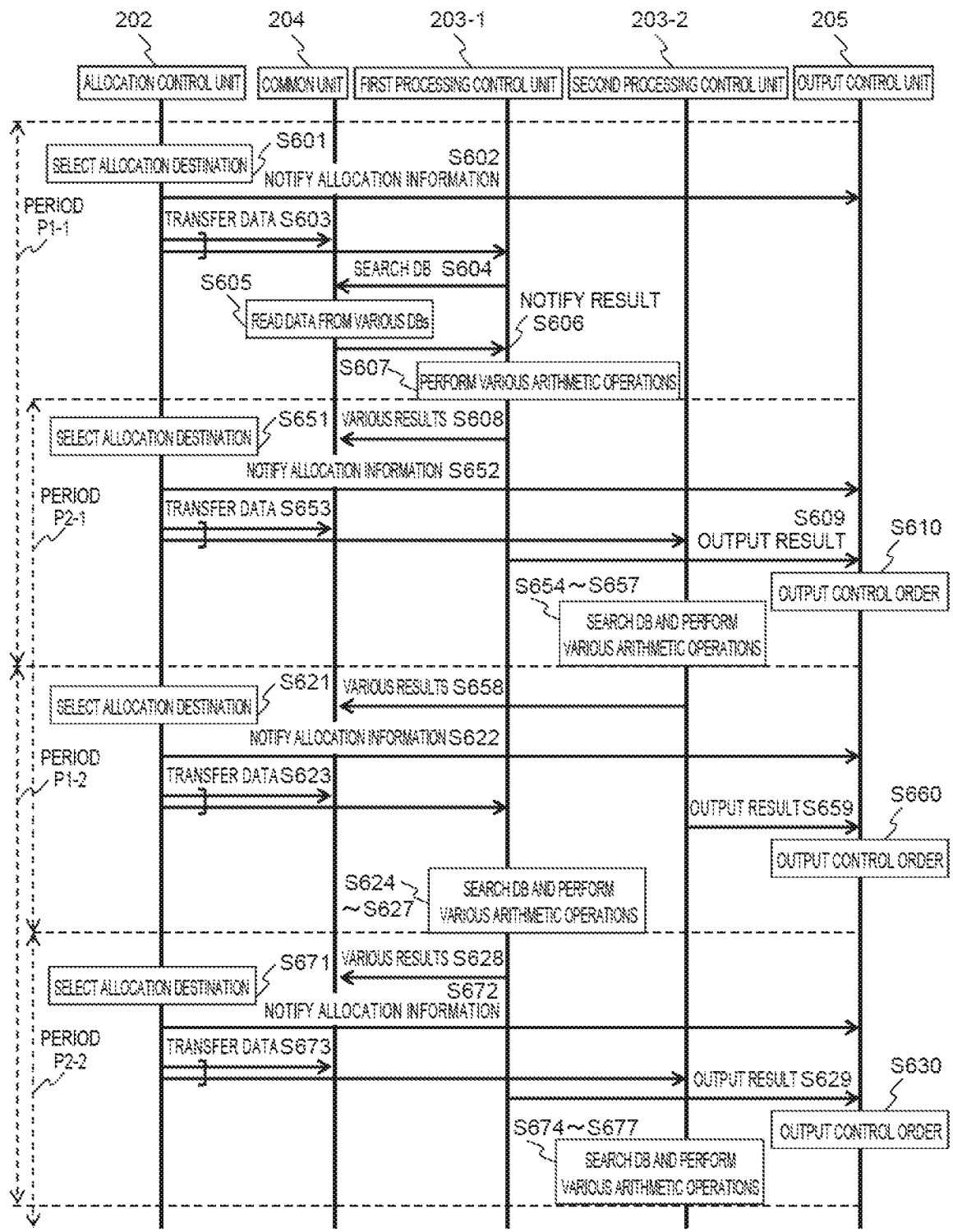
FIG. 7 is a sequence diagram showing the operation of the autonomous travel control device 2.

FIG. 7 is a sequence diagram showing the operation of the autonomous travel control device 2. FIG. 7 shows an overview of the operation of the allocation control unit 202, the first processing control unit 203-1, the second processing control unit 203-2, the common unit 204, and the output control unit 205 by using the example in which the two processing control units shown in FIG. 4 are configured in the autonomous travel control device 2.

The operating sequence shown in FIG. 7 intends to cause two processing control units 203 to alternately execute the peripheral cognition processing and the prediction processing while overlapping the period of the arithmetic processing. However, since it is difficult to indicate the timing of operations with the operating sequence shown in FIG. 7, causing two processing control units 203 to alternately execute the peripheral cognition processing and the prediction processing while overlapping the period of the arithmetic processing will be explained later with reference to the timing chart of FIG. 8.

With the autonomous travel control device 2, by overlapping the period of arithmetic processing of the peripheral cognition processing and the prediction processing, the output period of the arithmetic processing results can be shortened and the throughput can be improved when the two processing control units 203 are combined. The allocation control unit 202 allocates sensor information to the two processing control units 203 in a predetermined processing cycle so that the prediction processing result of the first processing control unit 203-1 and the prediction processing result of the second processing control unit 203-2 are output alternately and equally. The output control unit 205 outputs control order values, as a result of the sequential operation, based on the latest predicted path from the predicted path of the own vehicle acquired alternately from the two processing control units 203.

Note that, while FIG. 7 only shows the first processing control unit 203-1 for two cycles (P1-1 and P1-2) and the second processing control unit 203-2 for one cycle (P2-1) and the half-way processing of the second cycle (P2-2), these processing steps are repeated. P1 is the processing time per cycle of the first processing control unit 203-1, and P1-1 shows the first cycle and P1-2 shows the second cycle. P2 is the processing time per cycle of the second processing control unit 203-2, and P2-1 shows the first cycle and P2-2 shows the second cycle. The operating sequence of FIG. 7 is started when the first processing control unit 203-1 starts its processing.

Since the operation of each processing control unit 203 is a repetition of each cycle, one cycle worth of the operation of each processing control unit 203 will be explained. In other words, while the second cycle is also indicated in FIG. 7 to clarify that it is a repetition, explanation of the second cycle has been minimized since it will be redundant.

As shown in the upper part of FIG. 7, foremost, the allocation control unit 202 selects the first processing control unit 203-1 as the allocation destination according to a predetermined processing cycle (P1) (S601). Moreover, the allocation control unit 202 notifies the allocation of sensor information to the first processing control unit 203-1 and the processing completion timing of the first processing control unit 203-1 to the output control unit 205 as the allocation information (S602). Furthermore, the allocation control unit 202 transfers the data of sensor information to the first processing control unit 203-1 selected in step S601 (S603). Note that the allocation control unit 202 may also transfer the sensor information and the automated driving setting information to the common unit 204.

Next, the first processing control unit 203-1 searches the various DBs via the common unit 204 (S604). The common unit 204 reads map information from the map DB 5, searches the circuit management DB 3, and reads circuit data from the circuit DB 4 (S605). The common unit 204 notifies the read result to the first processing control unit 203-1 (S606).

The first processing control unit 203-1 starts the performance of various arithmetic operations after receiving the search result of the various DBs from the common unit 204 (S607). Specifically, the first processing control unit 203-1 executes, in order, the peripheral cognition processing and the prediction processing as a result of the first peripheral cognition processing unit 231-1 and the first prediction processing unit 232-1 utilizing the first arithmetic unit 233-1. Note that, while S607 is not indicated to be particularly larger than the other steps in FIG. 7 for the sake of drawing this figure, in effect the execution time of S607 accounts for a large percentage of one cycle. This will be explained in detail once again in FIG. 8 below. When the peripheral cognition processing and the prediction processing are respectively completed, the first processing control unit 203-1 notifies the processing results thereof to the common unit 204 (S608). In other words, while only one S608 is indicated in FIG. 7, in effect S608 is executed twice; namely, once when the peripheral cognition processing is completed and once when the prediction processing is completed.

While the first processing control unit 203-1 is executing various types of arithmetic processing in step S607, the allocation control unit 202 starts the subsequent allocation control. The allocation control unit 202 selects the second processing control unit 203-2 as the allocation destination according to a predetermined processing cycle (P2) (S651). Moreover, the allocation control unit 202 notifies the allocation of the sensor information to the second processing control unit 203-2 and the processing completion timing of the second processing control unit 203-2 to the output control unit 205 as the allocation information (S652). Furthermore, the allocation control unit 202 transfers the data of sensor information to the second processing control unit 203-2 selected in step S651 (S653). Note that the allocation control unit 202 may also transfer the sensor information and the automated driving setting information to the common unit 204.

Next, the second processing control unit 203-2 searches the various DBs in the same manner as the processing from step S604 to step S607, and starts the performance of various arithmetic operations (S654 to S657). Specifically, the second processing control unit 203-2 executes, in order, the peripheral cognition processing and the prediction processing as a result of the second peripheral cognition processing unit 231-2 and the second prediction processing unit 232-2 utilizing the second arithmetic unit 233-2. When the peripheral cognition processing and the prediction processing are respectively completed, the second processing control unit 203-2 notifies the processing results thereof to the common unit 204 (S658). In other words, while only one step S658 is indicated in FIG. 7, in effect step S658 is executed twice; namely, once when the peripheral cognition processing is completed and once when the prediction processing is completed.

Meanwhile, while the second processing control unit 203-2 is executing various types of arithmetic processing in step S653 to step S658, the first processing control unit 203-1 ends the various types of arithmetic processing started in step S607, and notifies the arithmetic operation results to the output control unit 205 (S609). Specifically, the first processing control unit 203-1 outputs the predicted path of the own vehicle generated by the first prediction processing unit 232-1. The output control unit 205 outputs control order values so as to satisfy the predicted path (S610). Step S601 to step S610 correspond to cycle P1-1. While step S654 to step S657 executed by the second processing control unit 203-2 are also included in cycle P1-1 for the sake of drawing this figure, sections before and after the completion of cycle P1-1 and the timing that step S654 to step S657 are executed may be ignored.

While the second processing control unit 203-2 is executing various types of arithmetic processing in step S657, the allocation control unit 202 starts the subsequent allocation control. The allocation control unit 202 selects the first processing control unit 203-1 as the allocation destination according to a predetermined processing cycle (P1) (S621). Moreover, the allocation control unit 202 notifies the allocation of the sensor information to the first processing control unit 203-1 and the processing completion timing of the first processing control unit 203-1 to the output control unit 205 as the allocation information (S622). Furthermore, the allocation control unit 202 transfers the data of sensor information to the first processing control unit 203-1 selected in step S621 (S623). Note that the allocation control unit 202 may also transfer the sensor information and the automated driving setting information to the common unit 204.

Next, the first processing control unit 203-1 searches the various DBs in the same manner as the processing from step S604 to step S607, and starts the performance of various arithmetic operations (S624 to S627). Moreover, in the course of executing the foregoing various arithmetic operations, the first processing control unit 203-1 notifies the results of the peripheral cognition processing and the prediction processing to the common unit 204 (S628).

Meanwhile, while the first processing control unit 203-1 is executing various types of arithmetic processing in step S623 to step S628, the second processing control unit 203-2 ends the various types of arithmetic processing started in step S657, and notifies the arithmetic operation results to the output control unit 205 (S659). Specifically, the second processing control unit 203-2 outputs the predicted path of the own vehicle generated by the second prediction processing unit 232-2. The output control unit 205 outputs control order values so as to satisfy the predicted path (S660). Step S651 to step S660 correspond to cycle P2-1. While step S624 to step S627 executed by the first processing control unit 203-1 are also included in cycle P2-1 for the sake of drawing this figure, sections before and after the completion of cycle P2-1 and the timing that step S624 to step S627 are executed may be ignored.

Moreover, while the first processing control unit 203-1 is executing various types of arithmetic processing in step S627 and step S628, the allocation control unit 202 starts the subsequent allocation control. Since the subsequent processing is a repetition of the above, the explanation thereof is omitted. Thereafter, the first processing control unit 203-1 and the second processing control unit 203-2 are alternately executed in a predetermined processing cycle. This ends the explanation of the overview of the operation shown in FIG. 7.

<Timing Chart>

Figure 8:
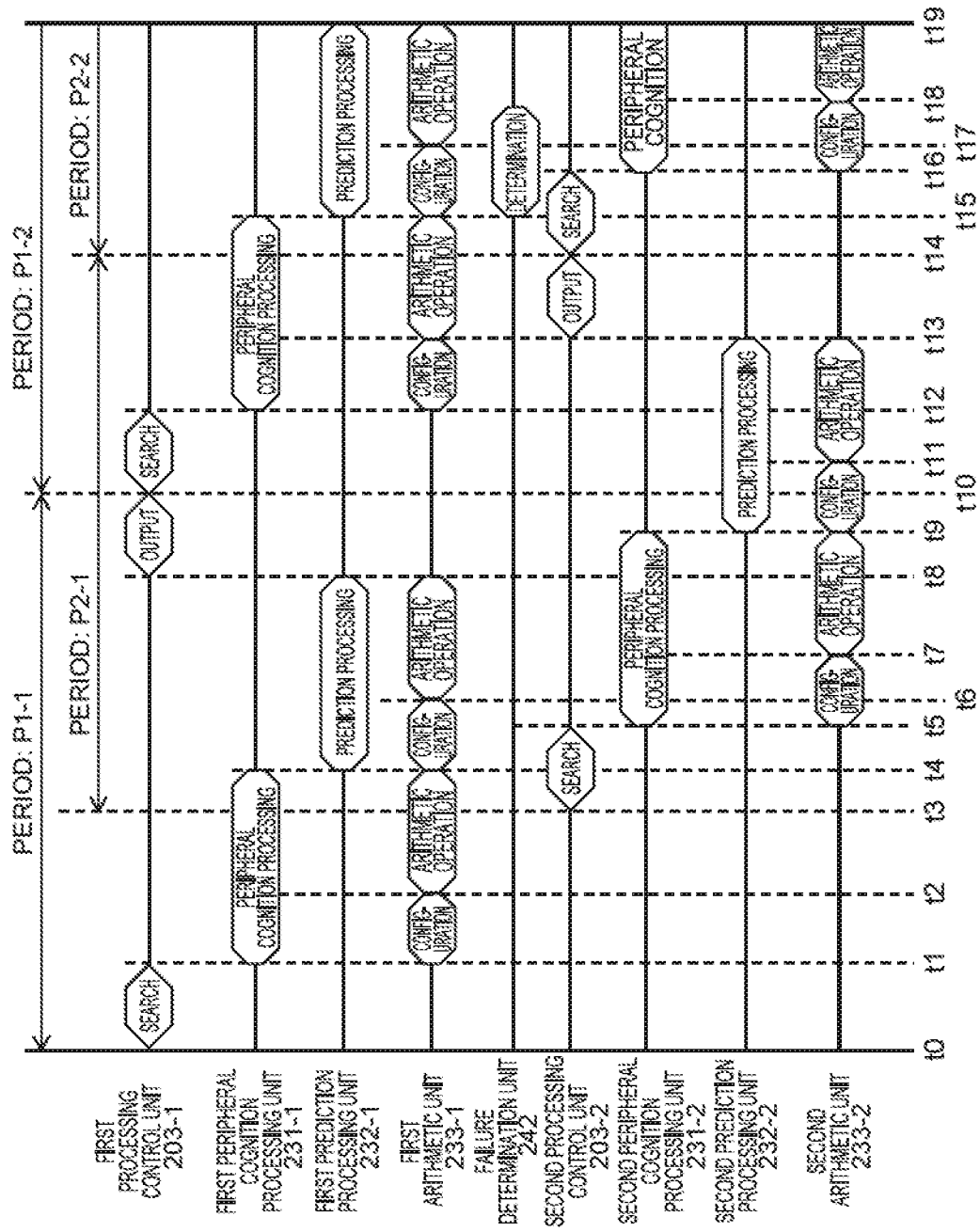
FIG. 8 is a timing chart showing the operation of the autonomous travel control device 2.

FIG. 8 is a timing chart showing the operation of the autonomous travel control device 2. In the example shown in FIG. 8, explained is the operational timing of the various arithmetic operations performed by the processing control unit 203; that is, the sections where the peripheral cognition processing unit 231 and the prediction processing unit 232 execute, in order, the peripheral cognition processing and the prediction processing by utilizing the arithmetic unit 233 in the overview of the operation shown in FIG. 7. Note that while most of the operations shown in FIG. 8 were explained in FIG. 7, the operation of the failure determination unit 242, which was not explained in FIG. 7, will also be explained in FIG. 8.

In FIG. 8, time is progressing from left to right. In FIG. 8, as shown at the far left, the processing and state of the first processing control unit 203-1, the first peripheral cognition processing unit 231-1, the first prediction processing unit 232-1, the first arithmetic unit 233-1, the failure determination unit 242, the second processing control unit 203-2, the second peripheral cognition processing unit 231-2, the second prediction processing unit 232-2, and the second arithmetic unit 233-2 are shown in order from the top.

The first processing control unit 203-1 starts predetermined cycle processing (P1-1) at time t0 based on the acquisition timing of the sensor information from the allocation control unit 202. The first processing control unit 203-1 searches the various DBs via the common unit 204, acquires map information from the map DB 5, and reads circuit data from the circuit DB 4. Note that this DB search corresponds to S604 of FIG. 7.

At time t1 when the reading is completed, the first peripheral cognition processing unit 231-1 starts the peripheral cognition processing. The first processing control unit 203-1 starts the reconfiguration of the logic circuit of the first arithmetic unit 233-1 using the circuit data, which is for the peripheral cognition processing in the first arithmetic unit 233-1, designated in the information of the first processing control unit circuit data shown with the symbol 502-1 in FIG. 6. Note that the processing from time t1 to time t8 described later corresponds to the processing of S607 of FIG. 7.

When the reconfiguration of the first arithmetic unit 233-1 is completed at time t2, the first arithmetic unit 233-1 starts the peripheral cognition processing. However, the term "configuration" is indicated in substitute of "reconfiguration" in FIG. 8 for the sake of drawing this figure. Here, in parallel with the first processing control unit 203-1, the second processing control unit 203-2 starts predetermined cycle processing (P2-1) at time t3 based on the acquisition timing of the sensor information from the allocation control unit 202. The second processing control unit 203-2 searches the various DBs via the common unit 204, acquires map information from the map DB 5, and reads circuit data from the circuit DB 4.

When the peripheral cognition processing of the first arithmetic unit 233-1 is completed at time t4, the first peripheral cognition processing unit 231-1 ends the peripheral cognition processing, and the first prediction processing unit 232-1 starts the prediction processing. The first processing control unit 203-1 starts the reconfiguration of the logic circuit of the first arithmetic unit 233-1 using the circuit data, which is for the prediction processing in the first arithmetic unit 233-1, designated in the information of the first processing control unit circuit data shown with the symbol 502-1 in FIG. 6. The first processing control unit 203-1 additionally outputs the results of the peripheral cognition processing to the common unit 204.

At time t5 when the reading started at time t3 is completed, the second peripheral cognition processing unit 231-2 starts the peripheral cognition processing. The second processing control unit 203-2 starts the reconfiguration of the logic circuit of the second arithmetic unit 233-2 using the circuit data, which is for the peripheral cognition processing in the second arithmetic unit 233-2, designated in the information of the second processing control unit circuit data shown with the symbol 502-2 in FIG. 6.

When the reconfiguration of the first arithmetic unit 233-1 is completed at time t6, the first arithmetic unit 233-1 starts the prediction processing. Moreover, when the reconfiguration of the second arithmetic unit 233-2 is completed at time t7, the second arithmetic unit 233-2 starts the peripheral cognition processing. When the prediction processing of the first arithmetic unit 233-1 is completed at time t8, the first processing control unit 203-1 starts the output of the path generation result of the own vehicle to the output control unit 205. The first processing control unit 203-1 additionally outputs the results of the prediction processing to the common unit 204.

When the peripheral cognition processing of the second arithmetic unit 233-2 is completed at time t9, the second prediction processing unit 232-2 starts the prediction processing. The second processing control unit 203-2 starts the reconfiguration of the logic circuit of the second arithmetic unit 233-2 using the circuit data, which is for the prediction processing in the second arithmetic unit 233-2, designated in the information of the second processing control unit circuit data shown with the symbol 502-2 in FIG. 6. The second processing control unit 203-2 additionally outputs the results of the peripheral cognition processing to the common unit 204.

When the output of the path generation result of the own vehicle to the output control unit 205 is completed, the first processing control unit 203-1 ends the processing of the first cycle (P1-1). Subsequently, the first processing control unit 203-1 starts the processing of the second cycle (P1-2) at time t10 based on the next acquisition timing of the sensor information from the allocation control unit 202. The first processing control unit 203-1 searches the various DBs via the common unit 204, acquires map information from the map DB 5, and reads circuit data from the circuit DB 4. Note that, when there is no update of the map information or update of the circuit data, the first processing control unit 203-1 may omit the search of the various DBs.

When the reconfiguration of the second arithmetic unit 233-2 is completed at time t11, the second arithmetic unit 233-2 starts the prediction processing.

At time t12 when the reading started at time t10 is completed, the first peripheral cognition processing unit 231-1 starts the peripheral cognition processing. The first processing control unit 203-1 starts the reconfiguration of the logic circuit of the first arithmetic unit 233-1 using the circuit data, which is for the peripheral cognition processing in the first arithmetic unit 233-1, designated in the information of the first processing control unit circuit data shown with the symbol 502-1.

When the reconfiguration of the first arithmetic unit 233-1 is completed at time t13, the first arithmetic unit 233-1 starts the peripheral cognition processing. Moreover, at the same time t7, the second arithmetic unit 233-2 completes the prediction processing, and the second processing control unit 203-2 starts the output of the path generation result of the own vehicle to the output control unit 205. The second processing control unit 203-2 additionally outputs the results of the prediction processing to the common unit 204.

When the output of the path generation result of the own vehicle to the output control unit 205 is completed, the second processing control unit 203-2 ends the processing of the first cycle (P2-1), and then starts predetermined cycle processing (P2-2) at time t14 based on the next acquisition timing of the sensor information from the allocation control unit 202. The second processing control unit 203-2 searches the various DBs via the common unit 204, acquires map information from the map DB 5, and reads circuit data from the circuit DB 4. Note that, when there is no update of the map information or update of the circuit data, the second processing control unit 203-2 may omit the search of the various DBs.

When the peripheral cognition processing of the first arithmetic unit 233-1 is completed at time t15, the first peripheral cognition processing unit 231-1 ends the peripheral cognition processing, and the first prediction processing unit 232-1 starts the prediction processing. The first processing control unit 203-1 starts the reconfiguration of the logic circuit of the first arithmetic unit 233-1 using the circuit data, which is for the prediction processing in the first arithmetic unit 233-1, designated in the information of the first processing control unit circuit data shown with the symbol 502-1 in FIG. 6. The first processing control unit 203-1 additionally outputs the results of the peripheral cognition processing to the common unit 204.

At the same time t15, the failure determination unit 242 that received the results of the peripheral cognition processing from the first processing control unit 203-1 executes the failure determination processing. However, while the execution timing of the failure determination unit 242 is time t15 in FIG. 8 for the sake of drawing this figure, in a precise sense the timing is after receiving the result of the peripheral cognition processing from the first processing control unit 203-1. Note that, thereafter, the failure determination unit 242 executes the failure determination processing each time it receives the result of the peripheral cognition processing from either the first processing control unit 203-1 or the second processing control unit 203-2. Details of the failure determination processing will be explained later.

At time t16 when the reading started at time t14 is completed, the second peripheral cognition processing unit 231-2 starts the peripheral cognition processing. The second processing control unit 203-2 starts the reconfiguration of the logic circuit of the second arithmetic unit 233-2 using the circuit data, which is for the peripheral cognition processing in the second arithmetic unit 233-2, designated in the information of the second processing control unit circuit data shown with the symbol 502-2.

When the reconfiguration of the first arithmetic unit 233-1 is completed at time t17, the first arithmetic unit 233-1 starts the prediction processing. Moreover, when the reconfiguration of the second arithmetic unit 233-2 is completed at time t18, the second arithmetic unit 233-2 starts the peripheral cognition processing. When the prediction processing of the first arithmetic unit 233-1 is completed at time t19, the first prediction processing unit 232-1 ends the prediction processing.

The processing at time t19 onward is a repetition of the processing at time t8 onward. Based on the processing explained above with reference to FIG. 8, the arithmetic operation results from the first processing control unit 203-1 and the second processing control unit 203-2 are output in a cycle of the period from time t8 to time t13. Consequently, throughput of the processing when taking the first processing control unit 203-1 and the second processing control unit 203-2 as a whole will improve.

Moreover, the failure determination unit 242 can execute the failure determination processing as needed.

<Failure Determination Processing>

FIG. 9 is a diagram showing an example of the failure determination method of the failure determination unit 242. The failure determination unit 242 performs failure determination using one latest peripheral cognition result and two latest prediction results. In the example shown in FIG. 9, time information is specifically indicated in correspondence with the failure determination at time t15 of FIG. 8.

Specifically, FIG. 9 shows an example where the common unit 204 acquires the prediction processing result of the first prediction processing unit 232-1 started at time t4 in FIG. 8 (this is hereinafter referred to as the "t4 prediction"), the prediction processing result of the second prediction processing unit 232-2 started at time t9 in FIG. 8 (this is hereinafter referred to as the "t9 prediction"), and the peripheral cognition result of the first peripheral cognition processing unit 231-1 started at time t12 in FIG. 8 (this is hereinafter referred to as the "t12 peripheral cognition"), and the failure determination unit 242 determines the existence of any failure or abnormality based on the foregoing results.

The t4 prediction is the prediction result using the peripheral information (sensor information) at time t1, the t9 prediction is the prediction result using the peripheral information at time t5, and the t12 peripheral cognition is the cognition result using the peripheral information at time t12. When comparing the three pieces of position information;

namely, the predicted position at time t12 predicted from time t1, the predicted position at time t12 predicted from time t5, and the cognition position at time t12, the existence of an abnormality is determined, for example, from the level of deviation of the position information. For instance, the failure determination unit 242 determines that everything is normal when the deviation of the position information is within a predetermined threshold, and determines that there is an abnormality when the deviation of the position information is greater than a predetermined threshold The five cases shown in FIG. 9 are now explained in order from the top. When the comparative result of the t9 prediction and the t12 peripheral cognition is determined to be "normal" and the comparative result of the t4 prediction and the t12 peripheral cognition is also determined to be "normal", the failure determination unit 242 determines that everything is "normal". This is because there is no abnormality.

When the comparative result of the t9 prediction and the t12 peripheral cognition is determined to be "normal" and the comparative result of the t4 prediction and the t12 peripheral cognition is determined to be "abnormal", the failure determination unit 242 determines that "the t9 prediction is abnormal". When the t4 prediction and the t9 prediction are treated as being equal, it is not possible to determine which one is problematic. However, since they are treated as being comparable to the peripheral cognition; that is, in the foregoing case, since the t12 peripheral cognition is the arithmetic operation result of the first peripheral cognition processing unit 231-1, it is determined that the t9 prediction is abnormal based on the notion that the t4 prediction arithmetically operated by the same first peripheral cognition processing unit 231-1 is likely to be more accurate. Here, the failure determination unit 242 may also notify the allocation control unit 202 to refrain from transferring the output to the second processing control unit 203-2, and thereby control the transfer sequence.

The third case from the top in FIG. 9 is as follows. When the comparative result of the t9 prediction and the t12 peripheral cognition is determined to be "abnormal" and the comparative result of the t4 prediction and the t12 peripheral cognition is determined to be "normal", the failure determination unit 242 determines that "the t4 prediction is abnormal". Here, the failure determination unit 242 may also notify the allocation control unit 202 to refrain from the transferring the output to the first processing control unit 203-1, and thereby control the transfer sequence.

When the comparative result of the t9 prediction and the t12 peripheral cognition is determined to be "abnormal", the comparative result of the t4 prediction and the t12 peripheral cognition is determined to be "abnormal", and the comparative result of the t4 prediction and the t9 prediction is determined to be "normal", the failure determination unit 242 determines that "the t12 peripheral cognition is abnormal". Here, the failure determination unit 242 may also notify the allocation control unit 202 to refrain from transferring the output to the second processing control unit 203-2, and thereby control the transfer sequence.

The last case of FIG. 9 is as follows. When the comparative result of the t9 prediction and the t12 peripheral cognition is determined to be "abnormal", the comparative result of the t4 prediction and the t12 peripheral cognition is determined to be "abnormal", and the comparative result of the t4 prediction and the t9 prediction is also determined to be "abnormal", the failure determination unit 242 determines that it is an "abnormal specific load". Here, the failure determination unit 242 may request assistance to the auxiliary control unit 107 such as by notifying the abnormality of the autonomous travel control device 2 to the auxiliary control unit 107 via the output control unit 205.

Note that the failure determination processing to be performed subsequent to time t15 is at the time that the common unit 204 receives the result of the peripheral cognition processing started from time t16 in the example of FIG. 8 (this is hereinafter referred to as the "t16 peripheral cognition"). Here, used are the t16 peripheral cognition, the t9 prediction, and the prediction processing result of the first prediction processing unit 232-1 started at time t15 (this is hereinafter referred to as the "t15 prediction"). For the determination in the foregoing case, the t4 prediction in FIG. 9 may be replaced with the t9 prediction, the t9 prediction may be replaced with the t15 prediction, and the t12 peripheral cognition may be replaced with the t16 peripheral cognition.

Note that the failure determination unit 242 may also store the information shown in FIG. 9 in the ROM 252 in advance, and execute the determination by referring to such information, or store the logic for determining a failure in the ROM 252 in advance, and execute the determination by using such logic. Note that this logic includes the determination which, when the two predictions do not coincide, the prediction that was arithmetically operated with the same system as the peripheral cognition is likely to be more accurate.

As explained above, according to this embodiment, it is possible to cause two or more processing control units to respectively execute, in order, similar arithmetic processing by overlapping the periods, and control the results as a sequential arithmetic operation result. Moreover, not only can the existence of a failure be determined, the processing unit that encountered the failure can also be determined. It is thereby possible to perform control so that the processing control unit determined as having a failure is not used. Thus, according to this embodiment, processing can be flexibly accelerated while suppressing the increase of power consumption and overhead. Furthermore, security can be further ensured by identifying the existence of a failure or the site of the failure, and changing the processing according to the identified site of failure.

According to the embodiment described above, the following effects are yielded.

(1) An autonomous travel control device 2, which is an electronic control device, comprises a first processing control unit 203-1 and a second processing control unit 203-2. The first processing control unit 203-1 and the second processing control unit 203-2 alternately start arithmetic processing with information of an external environment as an input. Arithmetic processing of the second processing control unit is started after certain arithmetic processing by the first processing control unit is started and before that arithmetic processing is ended. For example, in FIG. 8, the second processing control unit 203-2 starts arithmetic operation at time t5 which is midway during the arithmetic operation from time t1 to time t8 by the first processing control unit 203-1. Thus, the autonomous travel control device 2 can flexibly accelerate processing while suppressing the increase of overhead.

(2) The autonomous travel control device 2 comprises an output control unit 205 controls a first arithmetic operation result and a second arithmetic operation result as a sequential arithmetic operation result. Thus, similar to a case of comprising only one processing control unit 203, the autonomous travel control device 2 can treat the arithmetic operation results of two processing control units 203 as a sequential arithmetic operation result.

(3) Information of the external environment input to the first processing control unit 203-1 and information of the external environment to the second processing control unit 203-2 are information at different times. In other words, while the processing executed by the first processing control unit 203-1 and the processing executed by the second processing control unit 203-2 are similar, the data to be processed is different, and processing can be accelerated by the first processing control unit 203-1 and the second processing control unit 203-2 respectively processing different data.

(4) The autonomous travel control device 2 comprises an allocation control unit which alternately allocates collected information of the external environment to the first processing control unit 203-1 and the second processing control unit 203-2. The first processing control unit 203-1 and the second processing control unit 203-2 alternately start the arithmetic processing with alternately allocated information of the external environment as an input. Thus, the processing of the allocation control unit 202 is not complicated, and the overhead is small.

(5) The autonomous travel control device 2 comprises a failure determination unit 242 which compares an output based on the arithmetic processing of the first processing control unit 203-1 and an output based on the arithmetic processing of the second processing control unit 203-2, and detects a failure of the first processing control unit 203-1 or the second processing control unit 203-2 based on a result of the comparison. Thus, the autonomous travel control device 2 can detect a failure of the processing control unit 203.

(6) The arithmetic processing from time t1 to time t8 by the first processing control unit 203-1 is configured from processing from time t1 to time t4 by the first peripheral cognition processing unit 231-1 to cognize circumstances of an external environment at time t1 with information of the external environment at time t1 as an input, and prediction processing from time t4 to time t8 by the first prediction processing unit 232-1 of predicting circumstances of an external environment in a future time, which is later in time than a first period, based on an arithmetic operation result of the first peripheral cognition processing unit 231-1. The arithmetic processing from time t5 to time t13 by the second processing control unit 203-2 is configured from processing from time t5 to time t9 by the second peripheral cognition processing unit 231-2 to cognize circumstances of an external environment at time t5 with information of the external environment at time t5 as an input, and processing from time t9 to time t13 by the second prediction processing unit 232-2 of predicting circumstances of an external environment in a future time, which is later in time than time t5, based on an arithmetic operation result of the second peripheral cognition processing unit 231-2. The failure determination unit 242 determines a failure based on one latest peripheral cognition result and two latest prediction results, for example, in the example shown in FIG. 9, based on t4 prediction, t9 prediction, and t12 peripheral cognition. Thus, the autonomous travel control device 2 can identify a failure using three pieces of information.

(7) The failure determination unit 242 detects a failure of the first processing control unit 203-1 or the second processing control unit 203-2 on grounds that the arithmetic operation result of the second prediction processing is likely to be more accurate than the arithmetic operation result of the first prediction processing.

(8) Upon detecting a failure of the first processing control unit 203-1 or the second processing control unit 203-2, the failure determination unit 242 notifies the allocation control unit 202 of the failure of the corresponding processing control unit of either the first processing control unit 203-1 or the second processing control unit 203-2. The allocation control unit 202 discontinues allocation of the collected information of the external environment to the corresponding processing control unit 203. Thus, arithmetic operation using the processing control unit 203 in which a failure has been detected can be stopped.

(9) The first processing control unit 203-1 and the second processing control unit 203-2 are configured including a reconfigurable logic circuit 255, and execute the first arithmetic processing and the second arithmetic processing using the logic circuit 255. Thus, high-speed processing is enabled.

Modified Example 1

As shown in FIG. 3, the autonomous travel control device 2 may comprise three or more processing control units 203. In the foregoing case, the three or more processing control units 203 take turns executing the arithmetic operation in rotation.

Modified Example 2

In the foregoing embodiment, the failure determination unit 242 performed failure determination using one latest peripheral cognition result and two latest prediction results. Nevertheless, the failure determination unit 242 may also perform failure determination by using one latest peripheral cognition result and one latest prediction result. However, in the foregoing case, the prediction result and the peripheral cognition result will be based on the output of different processing control units 203. For example, the latest prediction result output by the first processing control unit 203-1 and the latest peripheral cognition result output by the second processing control unit 203-2 are compared, and it is determined that there is no abnormality if the deviation of the position information is within a predetermined threshold.

Modified Example 3

In the timing chart shown in FIG. 8, the failure determination unit 242 starts the determination processing at time t15, which is when the peripheral cognition processing has ended. Nevertheless, the timing that the failure determination unit 242 is to execute the failure determination processing is not limited to time t15, and the failure determination processing may be started at any time so as long as it is at time t15 onward.

Modified Example 4

In the foregoing embodiment, the first processing control unit 203-1 and the second processing control unit 203-2 used the logic circuit 255. There is no particular limitation in the hardware to be used by the first processing control unit 203-1 and the second processing control unit 203-2. For example, the first processing control unit 203-1 and the second processing control unit 203-2 do not need to use the logic circuit 255, may use the GPU 256, or may perform arithmetic operations only with the CPU 251.

Modified Example 5

The hardware configuration of the first processing control unit 203-1 may differ from the hardware configuration of the second processing control unit 203-2. For example, the first processing control unit 203-1 may be configured to use the logic circuit 255, and the second processing control unit 203-2 may be configured not to use the logic circuit 255.

Each of the embodiments and modified examples described above may be combined with each other. While various embodiments and modified examples were described above, the present invention is not limited to the subject matter thereof. Other modes considered to fall within the technical scope of the present invention are also covered by the present invention. Moreover, the foregoing embodiment was explained in detail for explaining the present invention in an easy-to-understand manner, and the present invention does not need to necessarily comprise all of the configurations explained in the embodiment. Furthermore, control lines and information lines are illustrated to the extent required for explaining the present invention, and not all control lines and information lines required for the product may necessarily be indicated. In effect, it may be understood that nearly all of the configurations are mutually connected.

The disclosure of the following priority application is incorporated herein by reference. Japanese Patent Application No. 2018-190180 (filed on Oct. 5, 2018)

REFERENCE SIGNS LIST

1 . . . in-vehicle system
2 . . . autonomous travel control device
100 . . . vehicle
202 . . . allocation control unit
203 . . . processing control unit
203-1 . . . first processing control unit
203-2 . . . second processing control unit
204 . . . common unit
205 . . . output control unit
231 . . . peripheral cognition processing unit
231-1 . . . first peripheral cognition processing unit
231-2 . . . second peripheral cognition processing unit
232 . . . prediction processing unit
232-1 . . . first prediction processing unit
232-2 . . . second prediction processing unit
233 . . . arithmetic unit
233-1 . . . first arithmetic unit
233-2 . . . second arithmetic unit
241 . . . database management unit
242 . . . failure determination unit
255 . . . logic circuit

The invention claimed is:

1. An electronic control device comprising a first processing control unit and a second processing control unit, wherein:
the first processing control unit and the second processing control unit alternately start arithmetic processing with information of an external environment as an input; and
second arithmetic processing of the second processing control unit is started after first arithmetic processing by the first processing control unit is started and before the first arithmetic processing is ended.

2. The electronic control device according to claim 1, further comprising:
an output control unit which controls a result of the first arithmetic processing and a result of the second arithmetic processing as a sequential arithmetic operation result.

3. The electronic control device according to claim 1, wherein information of the external environment input to the first processing control unit and information of the external environment to the second processing control unit are information at different times.

4. The electronic control device according to claim 1, further comprising:
an allocation control unit which alternately allocates collected information of the external environment to the first processing control unit and the second processing control unit,
wherein the first processing control unit and the second processing control unit alternately start the arithmetic processing with alternately allocated information of the external environment as an input.

5. The electronic control device according to claim 4, further comprising:
a failure determination unit which compares an output based on the arithmetic processing of the first processing control unit and an output based on the arithmetic processing of the second processing control unit, and detects a failure of the first processing control unit or the second processing control unit based on a result of the comparison.

6. The electronic control device according to claim 5, wherein:
the arithmetic processing of the first processing control unit is configured from first peripheral cognition processing to cognize circumstances of an external environment at a first time of day with information of the external environment at the first time of day as an input, and first prediction processing of predicting circumstances of an external environment in a future time, which is later in time than the first time of day, based on an arithmetic operation result of the first peripheral cognition processing;
the arithmetic processing of the second processing control unit is configured from second peripheral cognition processing to cognize circumstances of an external environment at a second time of day with information of the external environment at the second time of day as an input, and second prediction processing of predicting circumstances of an external environment in a future time, which is later in time than the second time of day, based on an arithmetic operation result of the second peripheral cognition processing;
the output based on the arithmetic processing of the first processing control unit is the arithmetic operation result of the first prediction processing in the arithmetic processing of the first processing control unit; and
the output based on the arithmetic processing of the second processing control unit is the arithmetic operation result of the second peripheral cognition processing in the arithmetic processing of the second processing control unit.

7. The electronic control device according to claim 5, wherein:
the first arithmetic processing is configured from first peripheral cognition processing to cognize circumstances of an external environment at a first time of day with information of the external environment at the first time of day as an input, and first prediction processing of predicting circumstances of an external environment in a future time, which is later in time than the first time of day, based on an arithmetic operation result of the first peripheral cognition processing;

the second arithmetic processing is configured from second peripheral cognition processing to cognize circumstances of an external environment at a second time of day with information of the external environment at the second time of day as an input, and second prediction processing of predicting circumstances of an external environment in a future time, which is later in time than the second time of day, based on an arithmetic operation result of the second peripheral cognition processing;

the output based on the arithmetic processing of the first processing control unit is the arithmetic operation result of the first prediction processing; and the output based on the arithmetic processing of the second processing control unit is the arithmetic operation result of the second prediction processing and the arithmetic operation result of the second peripheral cognition processing.

8. The electronic control device according to claim 7, wherein the failure determination unit detects a failure of the first processing control unit or the second processing control unit on grounds that the arithmetic operation result of the second prediction processing is likely to be more accurate than the arithmetic operation result of the first prediction processing.

9. The electronic control device according to claim 7, wherein:

upon detecting a failure of the first processing control unit or the second processing control unit, the failure determination unit notifies the allocation control unit of the failure of the corresponding processing control unit of either the first processing control unit or the second processing control unit; and the allocation control unit discontinues allocation of the collected information of the external environment to the corresponding processing control unit.

10. The electronic control device according to claim 1, wherein at least one of either the first processing control unit or the second processing control unit is configured including a reconfigurable logic circuit, and executes the first arithmetic processing or the second arithmetic processing using the logic circuit.

11. A parallel processing method executed by an electronic control device comprising a first processing control unit and a second processing control unit, the parallel processing method comprising the steps of:

causing the first processing control unit and the second processing control unit to alternately start arithmetic processing with information of an external environment as an input; and causing second arithmetic processing of the second processing control unit to be started after first arithmetic processing by the first processing control unit is started and before the first arithmetic processing is ended.

* * * * *